United States Patent
Engelhart

(10) Patent No.: US 7,333,809 B2
(45) Date of Patent: Feb. 19, 2008

(54) MULTI-STANDARD PREPAID COMMUNICATION SERVICES

(75) Inventor: Robert L. Engelhart, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 391 days.

(21) Appl. No.: 10/391,895

(22) Filed: Mar. 18, 2003

(65) Prior Publication Data

US 2004/0185828 A1    Sep. 23, 2004

(51) Int. Cl.
  *H04Q 7/22*    (2006.01)
(52) U.S. Cl. .................... 455/432.3; 455/406; 455/411
(58) Field of Classification Search ............ 455/405–9, 455/423.1–3, 433, 412.1, 413, 411
  See application file for complete search history.

(56) References Cited

U.S. PATENT DOCUMENTS

| | | | | |
|---|---|---|---|---|
| 5,946,380 A | * | 8/1999 | Cohen et al. | 379/127.01 |
| 6,058,300 A | * | 5/2000 | Hanson | 455/406 |
| 6,684,072 B1 | * | 1/2004 | Anvekar et al. | 455/432.1 |
| 6,950,876 B2 | * | 9/2005 | Bright et al. | 455/433 X |
| 2003/0119477 A1 | * | 6/2003 | Uppal et al. | 455/408 |

OTHER PUBLICATIONS

"3rd Generation Partnership Project; Technical Specification Group Core Network; Customised Applications for Mobile network Enhanced Logic (CAMEL) Phase 4; CAMEL Application Part (CAP) specification (Release 5)", 3GPP TS 29.078 5.0.0 (2002-06).

* cited by examiner

*Primary Examiner*—Philip J. Sobutka
(74) *Attorney, Agent, or Firm*—Michael H. Donohue; Davis Wright Tremaine LLP

(57) ABSTRACT

Calls to or from a prepaid subscriber of a wireless communication network are identified as being associated with prepaid services, and a prepaid identifier is associated with the call. The prepaid identifier and other call information such as call origin or destination is routed to a prepaid services management system in another network that determines if the call is to be authorized based on, for example, a prepaid subscriber account balance stored at the prepaid services management system. The prepaid identifier can be combined with a number associated with the call origin or destination, and the combination delivered to the prepaid services management system.

18 Claims, 4 Drawing Sheets

MULTI-STANDARD PREPAID COMMUNICATION SERVICES

TECHNICAL FIELD

The disclosure pertains to providing prepaid services in communication systems.

BACKGROUND

Wireless communication systems enable subscribers to send and receive communications at fixed or mobile locations. Typically wireless networks are configured so that a subscriber is associated with a wireless network based on a service agreement in according to which the subscriber receives a set of pre-arranged communication services in return for payment of a monthly service charge. Services that are not included in the pre-arranged communication services are billed to the subscriber in addition to the basic monthly service charge. Wireless network operators generally provide such services to subscribers who both elect such service plans and who qualify for such plans. Because such subscribers have significant access to communication services provided by the wireless network, a subscriber can accumulate significant network charges during any billing period so that network operators typically offer such periodic service plans to subscribers having acceptable credit histories in order to reduce account losses.

Some potential network subscribers cannot qualify for periodic subscription services because of unsatisfactory or otherwise insufficient credit histories. For example, some potential subscribers are youths who have yet to establish a credit history. In addition, some potential subscribers prefer to avoid the possibility of incurring the significant network charges that are possible with periodic service plans. For example, a parent can provide a child with a cell phone for emergency use, but is unable to control the use of the cell phone with the possibility that playful use by the child brings a substantial bill for network services. One way of accommodating such users is to provide prepaid communication services. A user provides a deposit to pay for services with a network operator, and the network operator permits the user to access services until the subscriber deposit is exhausted. In this way, the network operator avoids non-payment risks and the subscriber caps the total amount spent on network services.

While such prepaid systems offer advantages to both subscribers and network operations, implementation of such systems can be complex as network usage by the prepaid subscriber must be tracked so that the prepaid subscriber cannot exceed the pre-purchased amount or a negative credit balance limit. Wireless network technologies continue to experience rapid technical advances, and installed networks must be operated in conjunction with new, more sophisticated network elements. In addition, newly installed network elements are preferably configured so that customer services are migrated so that newly installed network elements support services for existing network subscribers. Accordingly, methods and systems are needed for providing prepaid services to communication system subscribers.

SUMMARY

Methods of providing prepaid services in a communication network comprise directing a service request to a first mobile network and associating the request with a prepaid subscriber based on a subscriber profile stored in the first mobile network. A service authorization is then requested from a second mobile network. In representative examples, the first mobile network and the second mobile network are configured to conform to a first network protocol and a second network protocol, respectively, and in additional examples, the first network protocol and the second network protocol are different. In other examples, the first mobile network provides a prepaid identifier to the second mobile network and in other examples, a prepaid identifier and a mobile identification number are provided to the second mobile network. In further examples, the requested service is authorized based on a prepaid subscriber account balance stored in the second mobile network. In additional examples, a service completion status for the authorized service is determined and the service completion status is delivered to the prepaid system of the second mobile network. In some examples, a service charge is assessed to the prepaid subscriber account balance based on the service completion status. In other examples, the service charge is not assessed to a prepaid subscriber account balance if the service request is directed to voice mail or if the requested service is incomplete. In still other examples, the prepaid subscriber account balance is insufficient for service authorization, and the prepaid subscriber is contacted to request account balance replenishment.

A prepaid subscriber management system comprises an input configured to receive a subscriber identifier and a prepaid identifier. A memory is configured to retain prepaid subscriber data, and a processor is configured to produce a call authorization based on the prepaid subscriber data. According to additional representative embodiments, a service duration timer is included and the processor is configured to initiate the service duration timer, and the call completion authorization provided by the processor is configured to expire after a selected service duration.

Network element that comprises n input configured to receive a service destination identifier and a prepaid identifier; and a prepaid database configured to store prepaid account data associated with the service destination identifier. A processor is configured to interrogate the prepaid database based on receipt of the prepaid identifier, and to authorize providing a requested service based on prepaid account data associated with the service destination. In additional examples, the input is configured to communicate with a public switched telephone network.

Methods of providing a communication service to a prepaid subscriber comprise receiving a call request at a first network and associating the call request with the prepaid subscriber, A request for prepaid subscriber account information is directed to a second network, and call completion is authorized based on the prepaid subscriber account information. In additional representative examples, the call request is associated with the prepaid subscriber by combining a prepaid identifier with a destination identifier. In other examples, the call request is associated with the prepaid subscriber by combining a prepaid identifier with a source identifier. In further examples, the request for prepaid subscriber account information is directed to the second network via a public switched telephone network. In other examples, a service charge is assessed to a prepaid subscriber account balance.

Methods of paying for communication services comprise associating a call request for a selected access location with a prepaid subscriber. A prepaid identifier and the selected access location are transmitted to a prepaid management system. A call completion authorization is provided based on a prepaid account status for the selected access location. In additional examples, the prepaid identifier and the selected access location are transmitted to the prepaid management system using a public switched telephone network and the selected access location is a call destination or a call source. In other examples, the prepaid identifier and a call access location identifier are combined.

These and other examples and features are set forth below with reference to the accompanying drawings.

DETAILED DESCRIPTION

References to 'a' or "an" embodiment or example do not necessarily refer to the same embodiment or example although they may. Lines of communication between two points do not necessarily indicate direct communication between the points, although they may. Communications identified by a single arrow may comprise information communicated together or in separate messages and/or signals. Examples are described based on representative communication network standards. Some examples include wireless communication networks configured based on the Global System for Mobile Communications (GSM), the Digital Advanced Mobile Phone Standard (D-AMPS), Interim Standard IS-54 (IS-54), and Interim Standard 136 (IS-136). Signaling between mobile switching centers (MSCs) and other devices and networks can be based on Signaling System 7 (SS7), Interim Standard 51 (IS-51), or other messaging standards or protocols. The examples described below refer to any particular standards for convenience in illustrating various features.

Figure 1:
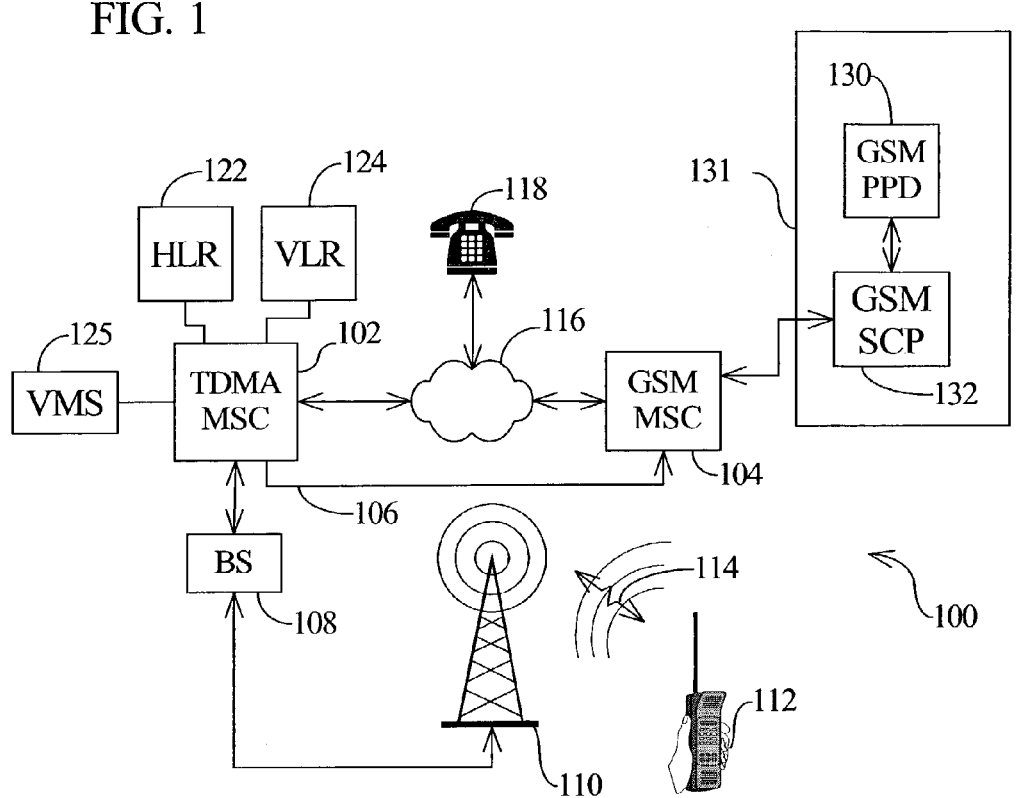
FIG. 1 is a schematic block diagram of a communication system that includes two wireless networks.

With reference to FIG. 1, a communication network 100 includes a mobile switching center (MSC) 102 that is in communication with a GSM MSC 104 via a communication link 106. The MSC 102 can be configured based on a communication standard such as IS-54 or IS-136 that permits communication signal multiplexing using time division multiple access (TDMA), and is referred to as the TDMA MSC 102. In the example of FIG. 1, the MSCs 102, 104 are configured based on particular communication standards such as, for example IS-136, SS7, GSM, or other standards. The TDMA MSC 102 is in communication with a base station (BS) 108 and an antenna 110 that are configured to communicate with a mobile station 112 using an air interface 114. The TDMA MSC 102 is also in communication with a public switched telephone network 116 configured for communication with a landline telephone 118. In some examples, networks are configured for communication among landline telephones, mobile telephones and other mobile stations, fax machines, computer networks, laptop computers, personal digital assistants, handheld computers or other devices. The TDMA MSC 102 is in communication with a home location register (HLR) 122 that contains subscriber information for subscribers associated with a wireless network of which the TDMA MSC 102 is a part, and a visitor location register (VLR) 124 that contains information associated with network users who are registered on the network on a specific TDMA MSC such as the TDMA MSC 102. The TDMA MSC 102 is also in communication with a voice messaging (VMS) system 125 that is configured to receive and store messages such as messages that are directed to a network subscriber at times the subscriber is unavailable.

The GSM MSC 104 is in communication with a GSM prepaid (PPD) subscriber management system (GSM PPD) 130 and a GSM service control point (SCP) 132. The GSM PPD 130 and the SCP 132 can be implemented in a single network component 131 as shown in FIG. 1, or in different systems, and can be situated at the same or different locations. The GSM PPD system 130 is configured to store subscriber information for prepaid network subscribers. Such subscriber information typically includes a current subscriber account balance, a renewal date/time at which the account balance is forfeited unless the subscriber updates the account balance, and other subscriber information. The GSM PPD system 130 also includes subscriber identifiers so that an account balance associated with a prepaid subscriber can be selected based on subscriber identifiers delivered by the TDMA MSC 102 to the GSM MSC 104. The SCP 132 is configured to deliver an authorization or a denial of service from the GSM PPD 130 to the TDMA MSC 102.

One example of communication using the network 100, the landline telephone initiates a call to the mobile station (MS) 112 that is associated with a prepaid subscriber. The call is directed to the TDMA MSC 102 that retrieves subscriber information from the HLR 122. Based on the retrieved subscriber information, the TDMA MSC 102 communicates with the GSM MSC 104 to obtain prepaid subscriber information, such as a call completion authorization, from the GSM PPD system 130. The PPD system 130 can be configured to grant or deny call completion authorization based on a user account balance, a call source, or a call billing rate. In addition, a network element can initiate a call timer so that depletion of the subscriber account balance can be tracked so that a connected call is not permitted to continue absent authorization of additional payment or addition of finds to the subscriber account balance. In addition, an authorization can be associated with a selected time interval after which authorization must be requested again. If the user does not answer, then the GSM PPD system 130 is informed of this condition and may or may not charge for the call depending on duration or other operator specified parameters. In some systems, call completion to a voice mail system is not billed against a user account balance, while in other systems voice mail call completion is billed.

The network 100 can be configured so that prepaid subscriber information is accessed upon call initiation by a prepaid subscriber and/or call completion to a prepaid subscriber. The MS 112 can be configured to communicate with the TDMA MSC 102 so that prepaid subscriber information is retrieved from the GSM PPD system 130 that is associated with the GSM MSC 104. The network 100 of FIG. 1 permits a prepaid subscriber management system configured for a particular network or communication standard to provide prepaid subscriber information for subscribers associated with networks that are configured according to other standards. Alternatively, prepaid subscriber information can be provided by a PPD system associated with a particular network or MSC, and retrieved by other networks or MSCs.

Figure 2:
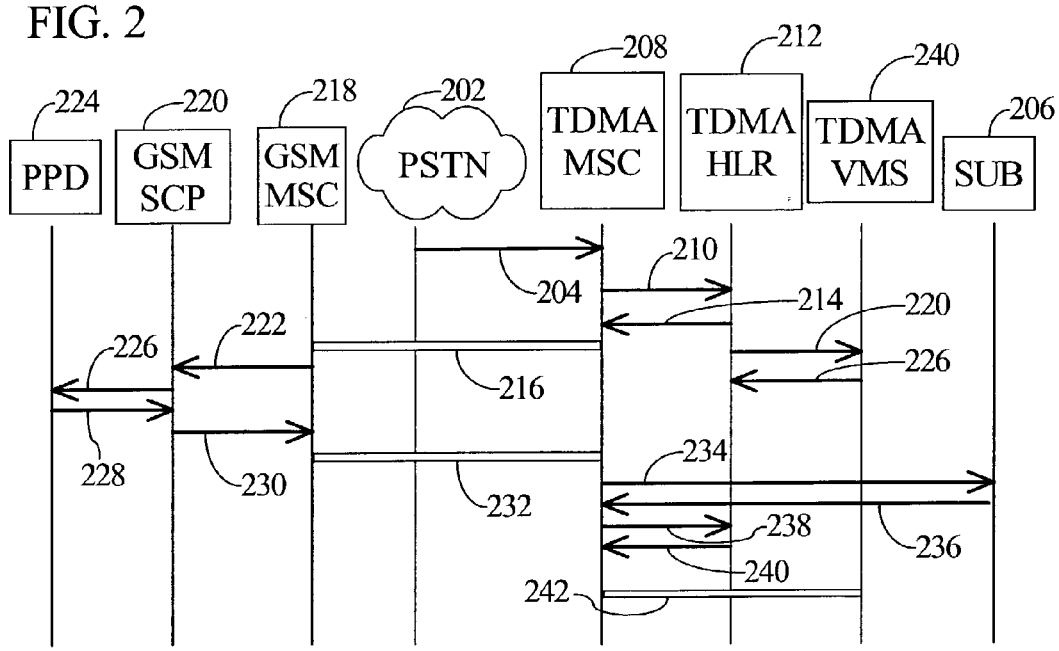
FIG. 2 is a schematic diagram illustrating processing of a call request to a prepaid subscriber of a wireless network.

FIG. 2 illustrates processing of a call to a prepaid subscriber (SUB) 206 from, for example, a public switched telephone network (PSTN) 202. An incoming call request 204 from, for example, a landline telephone via the PSTN 202 to the prepaid subscriber 206 is routed to a TDMA MSC 208. The MSC 208 issues a locate request (LOCREQ) command 210 for the called number to a home location register (HLR) 212 that returns a value locreq associated with on the called number in a communication 214. The value locreq includes destination information for the subscriber 206 as well as a prepaid identifier such as "000" to indicate that the called number is associated with a prepaid subscriber. If the called number is associated with postpaid services (such as, for example, a monthly subscriber), then the call is routed to the subscriber.

Prepaid subscribers are identified based on the value locreq based on, for example, the prepaid identifier "000" prepended to the called number. As shown in FIG. 2, prepaid subscriber account information is not stored in the MSC 208 or the HLR 212, but is instead associated with a GSM network, or a network based on another network standard. The MSC 208 establishes a voice communication path 216 to a GSM MSC 218, and an Initial Detection Point (INIT_DP) message 222 is delivered to a GSM service control point (SCP) 220. The INIT_DP message 222 can be specified with reference to, for example, "Customized Applications for Mobile Network Enhanced Logic (CAMEL) Phase 4; CAMEL Application Part Specification (Release 5)," 3GPP TS 29.078 v 3.14.0 (2002-12), and typically includes address and other information related to call routing, such as, for example, a calling number (CNI, callingPartyNumber), a caller name, a called number (calledPartynumber), or other parameters. The SCP 220 communicates information based on the INIT_DP message 222 to a prepaid subscriber management system (PPD system) 224. The PPD system 224 is configured to store and process prepaid subscriber information, such as, for example, a current prepaid account balance, and based on the subscriber information, establishes if a call to the subscriber 206 is to be authorized. If sufficient funds are not available, then the PPD system returns a message indicating that the call is not authorized, and the call can be released.

For call destinations for which adequate funds are available, authorization messages 228, 230 are returned to the GSM SCP 220 and the GSM MSC 218, respectively. The GSM MSC 218 removes the prepaid identifier and directs a call 232 to the TDMA MSC 208. The TDMA MSC 208 issues a ring command 234 to a mobile station associated with the subscriber 206. The MSC 208 determines if the mobile station is busy or rings but does not answer (RNA) based on a communication 236. If the mobile station is busy or RNA, then a number transfer request (TRANUMREQ) 238 is directed to the HLR 212. Typically the HLR 212 includes a call forwarding number (CFWN) associated with the subscriber 206 and a voice mail system (VMS) 240 that includes a subscriber voice mailbox. Based on the CFWN returned by the HLR 212, a voice channel 242 is established with the VMS 240 and a message for the subscriber 206 can be stored. As shown in FIG. 2, the call request 204 is terminated in the VMS 240 and is billed to the prepaid subscriber based on a prepaid subscriber configuration stored in the PPD system 224. Upon call completion, or completion of message delivery to the TMDA VMS 240, a call duration or other billing-related information is returned to the PPD system 224 so that subscriber account balances can be updated.

Figure 3:
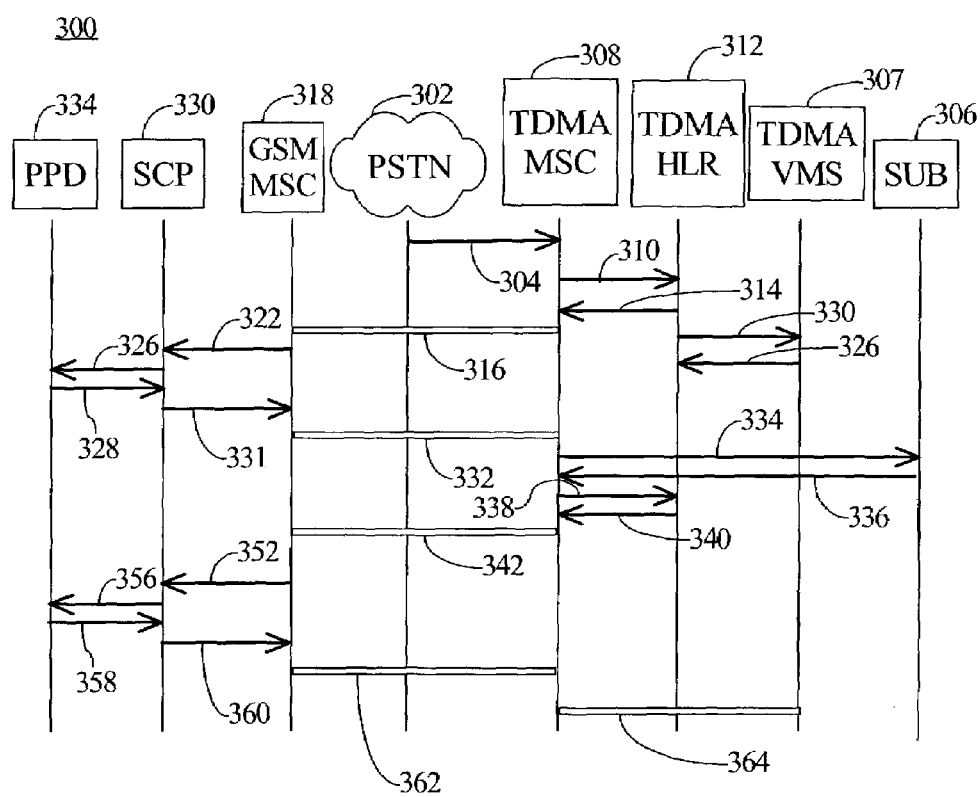
FIG. 3 is a schematic diagram illustrating processing of a call request to a prepaid subscriber of a wireless network

With reference to FIG. 3, a communication system 300 is configured to establish a voice channel to a prepaid subscriber and to terminate a call in a voice mail system, if the subscriber is unavailable, without billing the prepaid subscriber. An incoming call 304 from, for example, a PSTN 302 is directed to a TDMA MSC 308 that issues a location request (LOCREQ) 310 for destination information from a TDMA HLR 312. If the call destination is associated with prepaid service subscriber, then the HLR 312 returns a call destination information message 314 that includes a prepaid service identifier. In a representative example, the message 314 is based on a "000" identifier that is prepended to the called number. If the message does not contain the prepaid identifier, then the call is typically associated with a postpaid subscriber destination and can be completed without contacting a prepaid subscriber management system.

Calls associated with prepaid subscriber destinations are routed to a GSM MSC 318 that delivers a call destination information message to a service control point (SCP) 330 and a prepaid subscriber management system (PPD system) 334 in messages 322, 326, respectively. The PPD system 334 returns an authorization message 328 that includes the called number and a prepaid identifier to the SCP 330. Authorization information is delivered in a message 331 to the MSC 318 and in a voice channel 332 to the TDMA MSC 308. The GSM MSC 318 typically strips the prepaid identifier before delivering the call destination and authorization to the TDMA MSC 308. The TDMA MSC 308 then directs a message 334 to the prepaid subscriber 306 to indicate an incoming call. The prepaid subscriber 306 can be unavailable to answer the call, or the call destination can be busy. In some prepaid systems, calls that are not completed are not billed so that upon receiving a notification 336 that the destination is busy or does not answer, the TDMA MSC 308 again directs a message 338 to the TDMA HLR 308 that returns a message 340 that typically includes the prepaid identifier and a call forwarding number (CFWN). Based on the prepaid identifier, the TDMA MSC 308 communicates with the GSM MSC 318 over a voice channel 342, and messages 352, 356 are delivered to the SCP 330 and the PPD system 334, respectively. The PPD system 334 returns a message 358 authorizing call completion to a voicemail system, along with the prepaid identifier and the CFWN. Because call completion is reclassified as free, accumulation of charges using a billing clock is unnecessary. Call completion authorization is delivered to the TDMA MSC 308 over a voice channel 362. A voice channel 364 is then established for connection to a TDMA voice mail system 307. As a result, the incoming call is reclassified as a free call and a voice mail message is delivered to the TDMA VMS 307, without charging the prepaid subscriber for voice mail delivery. In some examples, the called number is not returned to the TDMA MSC 308 in the voice channel 362, and the caller is prompted to enter a mobile equipment identifier (MIN) associated with the voice mail destination.

Figure 4:
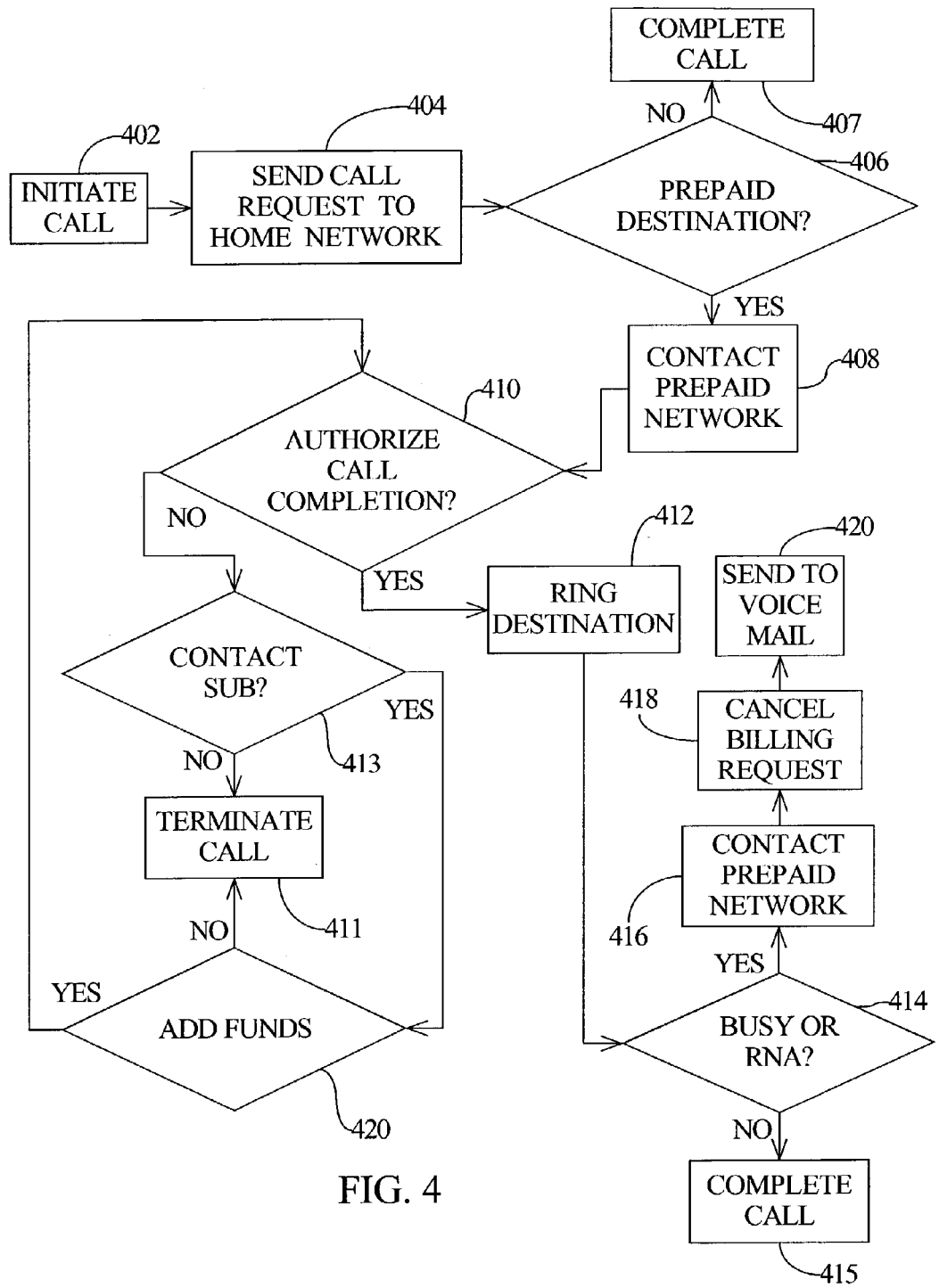
FIG. 4 is a block diagram illustrating a method of calling a prepaid subscriber.

FIG. 4 illustrates a method of calling a prepaid subscriber. In a step 402, a call is initiated and in a step 404 a home location register (HLR) associated with a subscriber's home network is queried. In a step 406, the subscriber type is evaluated to determine if the call destination is a prepaid destination. If the destination is not a prepaid destination, then the call is completed in a step 407. If the destination is a prepaid destination, then a prepaid network MSC is contacted in a step 408. Based on, for example, available billing credits, an account balance, a call source or call type, or other factors, a determination of whether to authorize call completion is performed at the prepaid network in a step

410. If the call is not authorized, then the call can be terminated in a step 411. Alternatively, delivery of a call indication can be selected in a step 413, so that a prepaid subscriber can be notified so that an account balance can be replenished and subsequent calls or the current call can be completed. After the account balance is selected for replenishment on a step 420, call authorization is again requested in the step 410. If the subscriber elects not to replenish his account, the call terminates in the step 411. If the call is authorized, then the call destination is contacted in a step 412. In a step 414, call status is evaluated to determine if the destination is busy or rings but does not answer (RNA). If the destination is busy, RNA, or is otherwise unavailable, the call can be directed to a voicemail system, with or without billing the prepaid subscriber for call completion to a voice mailbox. In a step 416, the prepaid network is contacted and in a step 418, the billing request is cancelled. In a step 420 the call to a busy or RNA destination is directed to a voice mail system. Typically the voice mail system is associated with the subscriber home network, and the home HLR is queried for information concerning contacting the voice mail system, such as, for example, a call forwarding number or a voice mailbox identifier. If the destination answers in the step 414, then the call is completed in a step 415.

Figure 5:
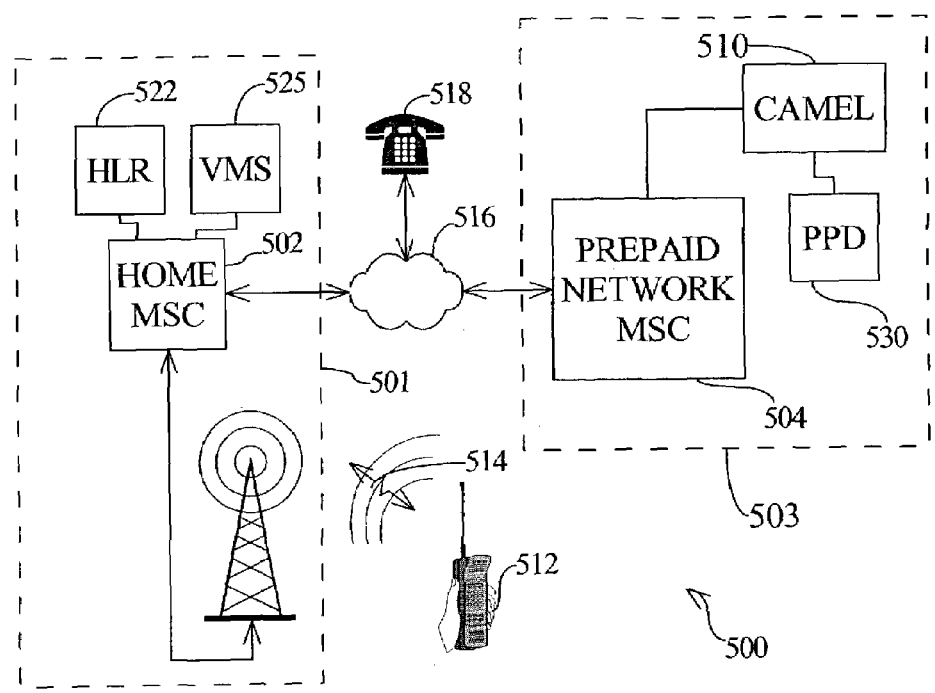
FIG. 5 is a block diagram of a communication system that includes a home network and a network associated with prepaid services management.

In representative examples, a prepaid subscriber management system is included in a network based on a GSM standard, and an IS-136 or otherwise configured network provides prepaid services based on a GSM prepaid subscriber management system. In some examples, the GSM-based network is configured to communicate with additional GSM-based networks or other networks according to a Customized Applications for Mobile Network Enhanced Logic (CAMEL) signaling protocol. FIG. 5 is a schematic diagram of a communication system 500 that includes a home wireless network 501 and a prepaid management wireless network 503. The home wireless network 501 includes a home MSC 502, an HLR 522, and a voice messaging system 525. The prepaid management wireless network 503 is configured based on a GSM standard and includes a CAMEL processor 510 and a prepaid subscriber management system (PPD system) 530. The CAMEL processor 510 is configured for signaling between other GSM-based networks or networks based on other standards. The communication system 500 supports communications between, for example, a mobile station 512 associated with a prepaid subscriber and a landline telephone 518 using a public switched telephone network 516. The HLR 522 includes subscriber information that identifies prepaid subscribers so that the home MSC 502 communicates with the prepaid MSC 504 to obtain call authorization from the PPD system 530. Typically, authorization of call completion also starts a billing clock so that re-authorization is requested before a subscriber account balance is depleted. For calls that terminate in no charge destinations such as, for example, a voicemail system, a call to a busy destination or a destination that does not answer can be returned to the PPD system 530 before (or after) the call is completed to voicemail so that such calls are not charged to the subscriber.

In a representative example, prepaid subscriber information is stored in a prepaid system configured for communication with a GSM mobile switching center, but the associated call (or origin) destination is accessed via a TDMA mobile switching center. Other network configurations can be associated with a home network and a prepaid network. For example, the home network can be a GSM-based network while a prepaid subscriber management system is associated with a TDMA network. In some examples, pre- paid subscribers are billed for originating calls, receiving calls, call forwarding to voicemail, and/or call retrieval from voicemail. In other examples, services are provided to postpaid subscribers based on a credit limit established at a prepaid management system. These and other examples are illustrative. Many alternative examples will be apparent to those skilled in the art, and the described examples should not be taken as limiting in scope. Rather, we claim all that comes within the scope of the following claims and equivalents thereto.

I claim:

1. A method of providing prepaid services in a communication network, comprising:
    directing a service request to a first mobile network;
    associating the request with a prepaid subscriber based on a subscriber profile stored in the first mobile network;
    requesting a service authorization for the requested service from a second mobile network; and
    receiving the service authorization from the second mobile network, wherein the service authorization is associated with a selected time interval after which service authorization must be requested from the second mobile network again.

2. The method of claim 1, wherein the first mobile network and the second mobile network are configured to conform to a first network protocol and a second network protocol, respectively.

3. The method of claim 2, wherein the first network protocol and the second network protocol are different.

4. The method of claim 1, wherein the first mobile network provides a prepaid identifier to the second mobile network.

5. The method of claim 4, wherein the prepaid identifier and a mobile identification number are provided to the second mobile network.

6. The method of claim 4, further comprising verifying that prepaid subscriber account balance is insufficient for service authorization, and contacting the prepaid subscriber to request account balance replenishment.

7. The method of claim 4, wherein the prepaid identifier identifies a prepaid subscriber group.

8. The method of claim 4, further comprising authorizing the requested service based on a prepaid subscriber account balance stored in the second mobile network.

9. The method of claim 8, further comprising:
    determining a service completion status for the authorized service; and
    delivering the service completion status to the prepaid system.

10. The method of claim 9, further comprising assessing a service charge to the prepaid subscriber account balance based on the service completion status.

11. The method of claim 10, wherein the service charge is not assessed to a prepaid subscriber account balance if the service request is directed to voice mail.

12. The method of claim 10, wherein the service charge is not assessed to a prepaid subscriber account balance if the requested service is not completed.

13. A network element, comprising:
    an input configured to receive a service destination identifier and a prepaid identifier;
    a prepaid database configured to store prepaid account data associated with the service destination identifier; and
    a processor configured to interrogate the prepaid database based on receipt of the prepaid identifier, and to authorize providing a requested service based on prepaid account data associated with the service destination, wherein the authorization for the requested serviced includes a time interval after which service authorization must be requested from the second mobile network again.

14. The network element of claim 13, further comprising a service duration timer, wherein the processor is configure to initiate the service duration timer, and the call completion authorization is configured to expire after a selected service duration.

15. The network element of claim 13, wherein the input is configured to communicate with a public switched telephone network.

16. The network element of claim 13, wherein the processor is configured to receive the prepaid identifier prepended to a service destination identifier and associate the requested service with a prepaid subscriber based on the prepended prepaid identifier.

17. The network element of claim 13, wherein the prepaid identifier is "000" and is prepended to the service destination identifier.

18. The network element of claim 13, wherein the prepaid identifier identifies a prepaid subscriber group.

* * * * *